Patented Dec. 23, 1947

2,433,311

UNITED STATES PATENT OFFICE 2,433,311

METAL SURFACE TREATMENT

Stanley P. Waugh, Westfield, N. J., assignor to Tide Water Associated Oil Company, Bayonne, N. J., a corporation of Delaware No Drawing. Application February 5, 1942, Serial No. 429,659

7 Claims. (Cl. 148—6.24)

The present invention relates to treatment of metal surfaces, and more particularly to a method for development or application of corrosion and wear resistant surfaces on metals. The invention also includes metal articles and surfaces so treated.

The treating composition used in this invention broadly comprises as one component a substance capable by chemical reaction of producing a protective film upon a metal surface, and as another component a substance effective to promote said chemical reaction and to cause the resulting film to be of uniform character. The latter substances, which are effective as reaction promoters, are salts of esters of sulfo-carboxylic acids. As distinguished from the art of surface coating with siccative materials, such as paint or the like, the present invention falls primarily within the category of surface treatment involving chemical reaction between the metal being treated and the treating composition. The invention provides a simple method for the treatment of metal surfaces whereby there is produced directly a uniform adherent protective film.

Although the treatment of the present invention is applicable to various metals, it is particularly efficacious as applied to steel surfaces or surfaces containing other ferrous metals. Such surfaces are thereby rendered resistant to rusting and to frictional wear. For example, it is particularly desirable to protect the surfaces of steel machine parts such as gears and the like, parts of internal combustion engines such as cylinder walls and piston rings, and other machine parts normally subject to corrosion prior to use and to wear during use. In the breaking in of modern internal combustion engines which are built to close tolerances between the frictionally engaging parts it is especially important to prevent rapid wear. The coating resulting from treatment of the instant invention when applied to such parts results in less scuffing and scratching of the engaging surfaces, thus permitting more rapid break-in and resulting in smoother-running engines of longer life. Other advantages of the invention will be apparent from the following detailed description thereof.

A particular feature of the invention comprises the treatment of metal surfaces with sulfur-containing compositions in the application thereon of a uniform sulfide film. The invention is adaptable to the application of other films, as, for example, films produced by treatment with phosphorus or other suitable film-forming substances. Those compounds or compositions employed as extreme pressure bases in lubricants generally are suitable. For convenience, however, the invention will be described herein in detail regarding the embodiment relating to use of sulfur as the reactive film-forming component.

In this embodiment the treating composition used comprises primarily a suitable compound or substance providing available sulfur as the sulfur base and a salt of an ester of a sulfo-carboxylic acid as the reaction promoter. Various sulfur-containing materials may be employed as the sulfur base. For example, a cheap and convenient material for this purpose is mineral oil having dissolved or combined therewith relatively small amounts of sulfur. Other suitable compositions constituting the sulfur base component are sulfurized tall oil (otherwise known as sulfurized wood fatty acid), sulfurized sperm oil either of the non-corrosive or corrosive type, or sulfurized vegetable oils such as cottonseed oil. Other sulfur-containing compounds are certain alkyl or aryl sulfides, such, for example, as dibenzyl disulfide.

In the treatment of various metals, for example various steels, with certain of these sulfur compounds substantially no sulfide coating is produced, and with others only spotty, non-uniform deposits are obtained. According to this invention, there is incorporated with the sulfur-containing material or base a salt of an ester of a sulfo-dicarboxylic acid and the metal surface is treated with the resulting composition to produce a uniform adherent sulfide coating thereon. It is thus apparent that the stated salts promote the desired reaction resulting in application of the desired sulfide coating. Examples of the salts which may be effectively used for this purpose include the alkali metal and alkaline earth metal salts, or other metal salts such as aluminum, of the alkyl esters (for example, lauryl, amyl and octyl esters) of sulfo-dicarboxylic acids. Of particular advantage in this respect are the salts of the dialkyl esters of the sulfo-dicarboxylic acids.

The composition used in the invention may be applied to the metal surfaces to be treated in various ways. One desirable method comprises immersion of the metal article to be treated in the treating composition, the latter being preferably heated to accelerate the reaction. Particularly good results are obtained when the mixture of film-forming component and promoter salt is associated with water during the metal treatment.

Various proportions of ingredients may be employed. Generally, however, the promoter salt will be present in minor proportions with respect to the film-forming component. Thus, treating compositions of the invention containing as low as .1% by weight of the promoter salt, based upon the weight of the sulfur base present, have given good results.

I have found that best results are obtained when the treating composition is slightly acidic. Regulation of the pH value to any particular degree will depend upon the specific application or use to which the composition is to be put, and may be adjusted if desired to suit various requirements by addition of suitable acids, as, for example, fatty acids such as oleic acid or other suitable acid or acidic substances.

The invention and its advantages will be apparent in the following illustrative examples and tests. As used herein for illustrating the invention, the 100 Pale oil designates a straight refined mineral oil having a viscosity at 100° F. of 100 to 120 Saybolt Universal seconds and a color value of 1½ to 3 on the A. S. T. M. color scale.

*Example I*

The following composition was prepared:

|  | Per cent by weight |
|---|---|
| 100 Pale oil containing .8% dissolved sulfur | 99.0 |
| Sodium salt of dioctyl sulfosuccinic acid | 1.0 |

50 c. c. of this composition were mixed with 5 c. c. of water and the resulting mixture was heated to about 200° F. A piece of steel drill rod was immersed in the hot mixture and allowed to remain therein for a few minutes. Upon removal from the treating composition and washing with water, the pin was observed to be coated with a dark, adherent, uniform coating.

In another experiment in which the above procedure was followed, except that the sodium salt of dioctyl sulfosuccinic acid was omitted from the treating composition, the drill rod was found to have no protective coating after the treatment.

*Example II*

Another section of steel drill rod was treated as in Example I with a composition consisting of 5 c. c. of water and 50 c. c. of a composition consisting of 89% by weight of sulfurized 100 Pale oil (containing .8% dissolved sulfur), 10% by weight of sulfurized sperm oil (9.5% non-corrosive sulfur) and 1% by weight of sodium salt of dioctyl sulfosuccinic acid. This treatment likewise resulted in a smooth, uniform and adherent sulfide film on the steel surface. In this case the film was somewhat more adherent than that applied in Example I. In a similar experiment in which the stated salt was omitted from the treating composition no protective coating was formed on the drill rod.

*Example III*

The treating composition in this example consisted of 5 c. c. of water and 50 c. c. of a composition comprising 89% by weight of the above stated sulfurized 100 Pale oil, 1% by weight of the sodium salt of dioctyl sulfosuccinic acid and 10% by weight of sulfurized tall oil. A piece of steel drill rod was treated in the manner described in Examples I and II with this composition, resulting in production thereon of a uniform, adherent coating similar to that described in the above examples. The coating produced in this instance was more uniform and more adherent than those resulting from use of the compositions of Examples I and II. This was due to the more acidic nature of the Example III composition, the sulfurized tall oil being more acidic than the sulfur bases used in the other two examples.

Use of the composition of Example III with the stated salt omitted produced no protective coating on a piece of steel drill rod.

The above examples clearly indicate the function of the salts of esters of sulfo-dicarboxylic acids in the composition in promoting the reaction of sulfur and the production of uniform films on the metal surface being treated.

Other methods of application of the treating compositions used in the present invention are suitable. For example, the composition is advantageously used in the quenching of metals, particularly ferrous metals. In this regard, the application of a protective film may be combined with quenching operations by immersing metal articles in a heated condition directly into the treating composition.

In cases where the active components of the composition are used with water, as in the above examples, various proportional amounts of water give satisfactory results. Thus, instead of using relatively small proportions of water, as in the examples, there may be used in certain instances relatively large proportions, such as, for example, 80%.

As has been indicated above, the invention provides surface coatings which are resistant to abrasion and seizing, such coatings being particularly advantageous in the case of steel bearing surfaces of engines and other mechanisms. Illustrative of this feature of the invention and of the load-carrying capacity of the surfaces produced may be cited the following tests.

The tests were made on an Almen extreme pressure lubricant testing machine, the construction of which is described in Bulletin of American Petroleum Institute (Proceedings) of December 1932, on pages 118 to 131. In the operation of this machine a test pin of ¼ inch diameter drill rod is rotated in a split bushing made of cold drawn steel at a speed of 600 R. P. M., the rod and bushing assembly being immersed in lubricating oil. Progressively increasing load is applied to the rod through the split bushing by means of a lever arm. Two pound weights are applied on the lever arm at 10 second intervals throughout the test, each two pound weight being equivalent to about 1000 pounds per square inch projected bearing area. The machine is run in this manner until seizure occurs, at which time lubrication is considered to have failed.

An Almen machine test pin and bushings were treated in the manner described in the above examples. The treating composition in this case consisted of 20% by volume of a mixture of 50% by weight of sulfurized tall oil, 47% by weight of sulfurized 100 Pale oil and 3% by weight of sodium dioctyl sulfo-succinate incorporated in 80% by volume of water. The coated rod resulting from this treatment was then positioned between the coated split bushing in the Almen machine and the machine operated as described hereinabove, using as the lubricant 100 Pale oil. After the weights applied to the lever arm of the machine totaled 14 pounds a slight seizure occurred and the rod was removed for inspection. It was observed that only a very small area of the coating had been removed during the test and that seizure occurred only in this small area.

In a similar test in which an untreated Almen drill rod and an untreated bushing were used with 100 Pale oil as the lubricant, failure occurred at only 4 pounds load on the lever arm. In this instance there was complete failure, as indicated by the badly burned and scuffed condition of substantially the entire surface of the rod.

These comparative tests showed the improvement in load-carrying capacity imparted by the surface treatment of the present invention and indicate applicability thereof to the rubbing surfaces of machine parts intended for operation under high unit loads.

Other tests were conducted to illustrate the corrosion resistant properties imparted to metal surfaces by practice of the invention. In these tests three solutions were used. The first was distilled water, the second sea water and the third aqueous hydrochloric acid solution. Into each of these three solutions was placed a piece of steel drill rod which had been treated according to the present invention to apply thereto a uniform sulfide coating or film, and a similar piece of steel drill rod which had not been so treated. After about 24 hours the samples were removed from the solutions. Examinations showed that all of the uncoated samples had been attacked by the solutions; the uncoated samples from the distilled water and sea water were covered with rust while the uncoated sample from the hydrochloric acid solution was etched and pitted. All three of the test samples which had been surface treated according to the present invention showed no visible attack by any of the three solutions; the sulfide coated surfaces were still smooth and uniform after the test.

Further in regard to the corrosion resistant nature of metals which have been surface treated according to the invention, it appears that the effect of treatment is not limited to the immediate surface of the metals, but extends inward somewhat into the subsurface resulting in a "passivating" of the underlying metal. This possibly results from reaction during treatment between metal situated at the grain boundaries of the metal structure, and the sulfur or other reactive base employed in the treating solution. To illustrate the penetrative effect of the treatment pieces of steel were treated with sulfur-base treating solutions of this invention to produce uniform sulfide coatings on the surfaces thereof. The sulfide coating was then removed from each piece by filing until a bright metallic surface was exposed. The steel pieces were then immersed in distilled water and hydrochloric acid respectively in the manner described above along with pieces of similar steel which had not been surface treated. Upon removal of the specimens after 24 hours immersion the metallic surfaces of the pieces from which the coating had been removed were still bright and uncorroded, whereas the untreated pieces were covered with rust and etch marks. This feature of the invention is important in that there can be produced corrosion resistant surfaces of bright metallic appearance for various uses where a dull protective surface may be undesired.

In addition to its corrosion resistance and wear resistance properties indicated above, the film produced by the surface treatment of the present invention is also particularly adherent to paint and other siccative finish coats. This additional property of the film makes the treatment herein disclosed particularly advantageous as applied to metal surfaces intended to be painted, such as steel automobile bodies and fenders, in the application of a combined protective and paint-base film.

Reference is hereby made to application Serial No. 389,169, filed April 18, 1941, and now matured into Patent No. 2,342,027, relating to non-aqueous mineral oil lubricating compositions stabilized against deterioration by incorporating therein effective amounts of salts of esters of sulfo-carboxylic acids.

I claim:

1. Method for producing bright metallic corrosion-resistant surfaces upon metals normally of low corrosion resistance comprising applying to said metal a sulfur-containing organic liquid in the presence of water and of a salt of an alkyl ester of a sulfo-dicarboxylic acid effective to promote reaction between said sulfur and said metal and produce thereon a dull sulfide film, and then removing said dull sulfide film to expose the underlying metallic corrosion-resistant surface.

2. Method for producing a corrosion and wear resistant sulfide surface on metals normally of low corrosion resistance which comprises applying to said metals a composition comprising an organic liquid containing available metal reactive sulfur, water and from about 0.1% to 3% by weight of a metal salt of an alkyl ester of a sulfo-dicarboxylic acid, said salt being effective to promote reaction between sulfur of the sulfur-containing organic liquid and said metals to produce a sulfide film on said metals.

3. Method for producing a protective sulfide sulface on steel articles which comprises applying to the surfaces of said articles a composition comprising an organic liquid containing available metal reactive sulfur, water and a metal salt of a dialkyl ester of a sulfo-dicarboxylic acid, said salt being employed in a minor amount by weight effective to promote reaction between sulfur of the sulfur-containing organic liquid and said metal surfaces to produce a sulfide film on said articles.

4. Method for producing a corrosion and wear resistant sulfide coating on the surface of metals normally of low corrosion resistance which comprises applying to the metal surface a composition comprising an organic liquid containing metal reactive sulfur, water and a metal salt of an alkyl ester of a sulfo-dicarboxylic acid in a minor proportion effective to promote reaction of said metal reactive sulfur and the metal surface to produce said sulfide coating thereon and allowing said composition to remain in contact with the metal surface until the said coating is formed.

5. Method for producing a corrosion and wear resistant sulfide coating on the surface of metals normally of low corrosion resistance which comprises heating and applying to the metal surface a composition comprising an oil, metal reactive sulfur, water and an alkali metal salt of an alkyl ester of a sulfo-dicarboxylic acid in a minor proportion at least 0.1% by weight effective to promote reaction of said metal reactive sulfur and the metal surface to produce said sulfide coating thereon and allowing said composition to remain in contact with the metal until the said coating is formed.

6. Method for producing a corrosion and wear resistant sulfide coating on ferrous metals which comprises applying to said metals a composition containing in essential combination a sulfurized mineral oil, water and about 0.1 to 3% by weight of an alkali metal salt of an alkyl ester of a sulfo-dicarboxylic acid, said salt being effective to promote reaction between sulfur of the sulfurized mineral oil and said metal to produce a sulfide film thereon, and allowing the composition to remain in contact with the metal surface until the said coating is formed.

7. A metal article having a passivated, bright, corrosion-resistant surface with sulfide reaction products situated at the grain boundaries of the metal structure and being produced by applying to the surface of said article a sulfur-containing organic liquid in the presence of a salt of an alkyl ester of a sulfo-dicarboxylic acid effective to promote reaction between said sulfur and said metal and produce thereon a dull sulfide film, and then removing said dull sulfide film to expose the underlying corrosion-resistant surface.

STANLEY P. WAUGH.

REFERENCES CITED

The following references are of record in the file of this patent:

UNITED STATES PATENTS

| Number | Name | Date |
|---|---|---|
| 983,377 | Lang | Feb. 7, 1911 |
| 1,082,161 | Lang | Dec. 23, 1913 |
| 1,317,351 | Chadwick | Sept. 30, 1919 |
| 2,028,091 | Jaeger | Jan. 14, 1936 |
| 2,062,652 | Herrmann | Dec. 1, 1936 |
| 2,167,439 | Kaufman | July 25, 1939 |
| 2,176,423 | Jaeger | Oct. 17, 1939 |
| 2,179,063 | Smith | Nov. 7, 1939 |
| 2,246,415 | Potter | June 17, 1941 |
| 2,263,905 | Snow | Nov. 25, 1941 |
| 2,266,377 | Neely | Dec. 16, 1941 |
| 2,266,378 | Farrington | Dec. 16, 1941 |
| 2,266,379 | Floyd | Dec. 16, 1941 |
| 2,266,380 | Neely | Dec. 16, 1941 |
| 2,342,027 | Waugh | Feb. 15, 1944 |
| 2,361,804 | Wilson | Oct. 31, 1944 |